CRYOGENIC MEMORY CIRCUIT

Filed Dec. 21, 1964

2 Sheets-Sheet 1

INVENTORS U. F. GIANOLA
F. B. HAGEDORN
BY Herbert M. Shapiro
ATTORNEY

Dec. 5, 1967 U. F. GIANOLA ET AL 3,356,999

CRYOGENIC MEMORY CIRCUIT

Filed Dec. 21, 1964 2 Sheets-Sheet 2

United States Patent Office 3,356,999
Patented Dec. 5, 1967

3,356,999
CRYOGENIC MEMORY CIRCUIT

Umberto F. Gianola, Florham Park, and Fred B. Hagedorn, Berkeley Heights, N.J., assignors to Bell Telephone Laboratories, Incorporated, New York, N.Y., a corporation of New York Filed Dec. 21, 1964, Ser. No. 420,032
6 Claims. (Cl. 340—173.1)

ABSTRACT OF THE DISCLOSURE

A cryogenic memory including first and second current paths in each cell therein is described. A current is present always in one of the two current paths in each cell depending on the state of a cryotron in each path. Coincident currents access each cell to determine the state of the cryotrons. An access current bypass also is included at each cell. One of the access currents determines whether or not the other access current accesses a cell or is routed through the bypass at the cell.

This invention relates to memory devices. More particularly, this invention relates to memories accessed on a coincident-current basis.

One conventional coincident-current memory of, for example, the superconducting type is the well known continuous sheet memory which stores information as first and second directions of circulating currents at bit locations therein. Pulses for accessing such bit locations are necessarily limited in amplitude so that a single pulse does not cause the critical current to be exceeded in any bit location. A further consideration for determining access pulse amplitudes is that two such pulses, in coincidences, be sufficient to cause that critical current to be exceeded when the stored current is of the appropriate sense. These limitations permit pulse variations of about ±14% as is well known (see, for example, V. L. Newhouse, "Applied Superconductivity," John Wiley and Sons, Inc., 1964, page 233 et seq.). Unfortunately, the material and dimensional variations from bit location to bit location in a superconducting plane are such that practical superconducting memories of only limited size (viz., relatively few bit locations) are operable within such limitations. Superconducting memories, however, are economically competitive only in relatively large sizes where the cost of the necessary refrigeration equipment may be shared by a large number of storage locations. Consequently, such coincident-current superconducting memories have met with little commercial success.

Another type of superconducting memory is the cryotron memory which is organized in a linear select mode. In this connection, cryotrons are superconducting circuits wherein first and second superconductors, the first characterized by a higher critical current than the second, are adjacent one another. The state of the second superconductor, that is, resistive or superconducting respectively, is determined by the presence or absence of a current in the adjacent first superconductor where that current produces a magnetic field in excess of the critical field of the second superconductor. Cryotron memory storage locations typically include first and second paths each including a cryotron. A current is established in one path of each of a number of locations, and by driving resistive one of the cryotrons in a location, that current may be made to flow in one path or the other therein. The position of the current represents a binary value.

Cryotron linear select memories also have their difficulties. These difficulties, however, are due to the fact that such memories are organized in the linear select mode rather than to any inherent difficulties in the cryotron arrangement itself. For example, one difficulty is that in large linear select memories one sense line couples bit locations on many memory planes. This requires interconnections between the planes. The typical surge impedance of such a sense line is on the order of one ohm. The interconnections between the sense lines on adjacent planes at this impedance level and at the nanosecond range of operation contemplated have not been realized with present technology. Moreover, the access switch for an $n^2$ word linear select memory requires $n^2$ positions. If the access switch is to be composed entirely of a superconducting tree structure, interconnections between planes therein present similar problems. If the access switch is not superconducting, the cost thereof is relatively high for large memories. Nor are the problems readily overcome by an increase in the size of the planes because present technology provides planes of the order of up to ten inches square. Such planes presently include, at best, about $2\times10^3$ bit locations, far less than would be required to offset the cost of the refrigeration equipment.

Coincident-current organization of a cryotron superconducting memory would seem to overcome or, at least, alleviate considerably the aforementioned difficulties. For one thing, the coincident-current organization allows a single sense line for each memory plane. The absence of interconnections between the sense lines of adjacent planes obviates the troublesome interconnection problems. Moreover, coincident-current organization includes two switches per plane each with $n$ positions to access $n^2$ bit locations and so alleviates the difficulties associated with the access switch. Cryotron memories of the type described, however, do no lend themselves to coincident-current organization primarily because of the aforementioned limitations on accessing pulse amplitudes which would also result were a cryotron selected on a coincident-current basis.

It is an object of this invention to provide a new and novel coincident-current cryotron memory characterized by relatively wide operating margins.

The foregoing and further objects of this invention are realized in one embodiment thereof wherein a superconducting coincident-current memory includes a plurality of bit locations each comprising a storage site (cell), a current routing means, and a bypass. In accordance with this arrangement, one accessing pulse is applied to a selected set of bit locations, and a coincident accessing pulse determines whether that first mentioned pulse is routed to a particular storage site or through the bypass thereabout. By routing the first mentioned pulse only to one storage site of an accessed set, a coincident-current organization is provided wherein margin limitations are functions of the geometry of the various superconducting paths and are independent of the considerations described therefor hereinbefore. Accordingly, material and dimension variations do not represent a substantial problem in accordance with this invention. The term "bit location" will be used hereinafter to designate collectively the storage site and the routing means and the bypass at each storage site.

Accordingly, a feature of this invention is a coincident-current superconducting memory wherein each bit location includes a storage site, a bypass, and routing means for determining, in each instance, whether an accessing current operates on the storage site or bypasses it.

The foregoing and further objects and features of this invention will be understood more fully by a consideration of the following detailed description rendered in conjunction with the accompanying drawing in which.

Figure 1:
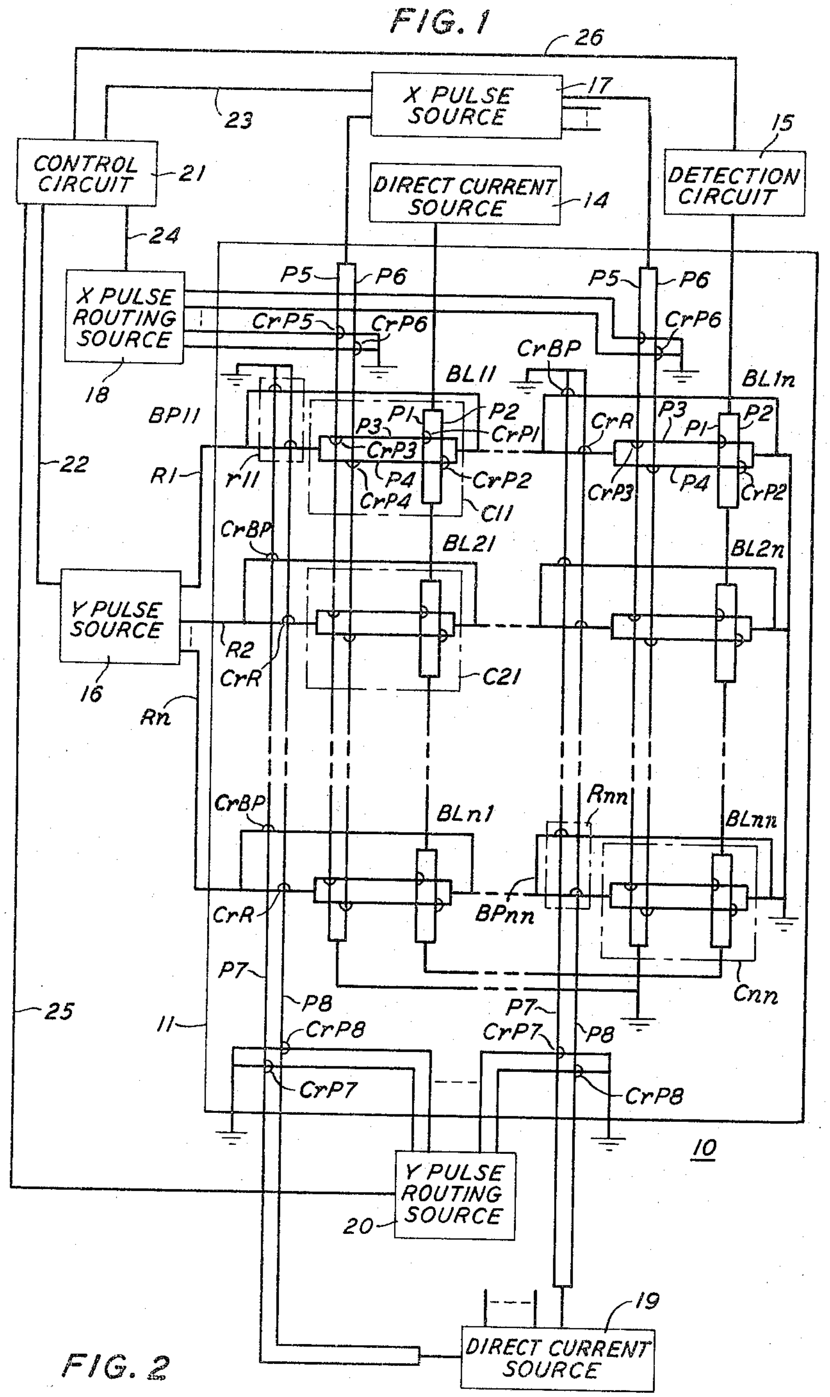
FIG. 1 is a schematic representation of a coincident-current cryotron memory in accordance with this invention.

FIG. 1 shows a coincident-current cryotron memory 10 in accordance with this invention. The memory includes a superconducting ground plane 11 which is coextensive with an insulating layer (undesignated) upon which the various superconducting paths are formed. It is to be understood that operation of superconducting memories is conducted at low temperatures for which special equipment is required. This equipment is well known in the art and is assumed present although such equipment is not shown. Similarly, the formation of superconducting paths and cryotrons and the materials useful therefor as well as the function of the ground plane are well known and are not discussed further herein.

The memory 10 comprises, illustratively, a matrix of $n^2$ bit locations BL11, BL12 . . . BL1$n$ . . . BL$nn$. Each bit location designation includes numerals corresponding to the row and column, respectively, of the matrix, in which the bit location so designated is positioned. Each bit location comprises a storage cell designated C, a bypass designated BP, and a means for routing an accessing current selectively to the storage cell and the bypass. This routing means is designated $r$. The various designations for the cells, bypasses and routing means include numerals corresponding to those of the bot locations in which the designated element is positioned.

Figure 2:
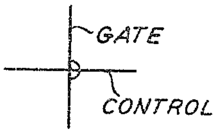
FIG. 2 is a symbolic representation of a cryotron.

In the illustrative embodiment, each storage cell comprises a pair of paths designated P1 and P2, referred to collectively as a "path-pair" herein. Each path includes a cryotron designated C$r$ as is most clearly shown in FIG. 3. Each cryotron designation also includes the designation of the path in which the so designated cryotron is positioned. The cryotron, as shown in FIG. 2, includes two adjacent superconductors, one termed a "gate," the other termed a "control." The cryotron is operated in a manner whereby a current in the control drives the gate resistive. If a parallel path is available for current in the gate, current flow is inhibited in the gate, in the above manner. The term "cryotron" herein is employed to designate only the adjacent portions of two superconductors. The path-pairs, including paths P1 and P2, of all the cells in the memory are connected electrically in series between a direct current source 14 and a detection circuit 15. For clarity, the cell at a representative bit location is described primarily in connection with FIG. 3. In that figure, it may be seen that the controls of cryotrons C$r$P1 and C$r$P2 are electrically in parallel with one another. These controls, in addition, are connected, as is shown in FIG. 1, electrically in series by one of a plurality of row superconductor paths R1 . . . R$n$ with the controls of the like cryotrons of all the cells in the corresponding row between a Y pulse source 16 and ground.

The controls for cryotrons C$r$P1 and C$r$P2 of each cell are formed by superconducting paths designated P3 and P4, respectively. Each of these paths includes a cryotron C$r$P3 and C$r$P4 and the controls therefor are superconducting paths designated P5 and P6, respectively. The controls for the cryotrons C$r$P3 and C$r$P4 of all the cells in a column, paths P5 and P6, are connected between an X pulse source 17 and ground as shown in FIG. 1. In addition, paths P5 and P6 of each column include cryotrons C$r$P5 and C$r$P6, respectively, the controls for which are connected in parallel between an X pulse routing source 18 and ground. Alternatively, the paths P5 and P6 of all the columns may be connected electrically in series (not shown) between X pulse source 17 and ground. In this arrangement, all the cryotrons C$r$P5 and all the cryotrons C$r$P6 are connected in series (not shown) between a suitably simplified source 18 and ground. Further, each bit location includes a superconducting bypass BP which is connected to the corresponding row conductor electrically in parallel with paths P3 and P4.

Figure 3:
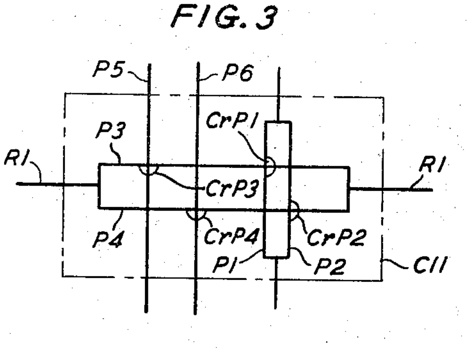
FIG. 3 is a schematic representation of a cryotron storage site (cell) in accordance with this invention.
Figure 4:
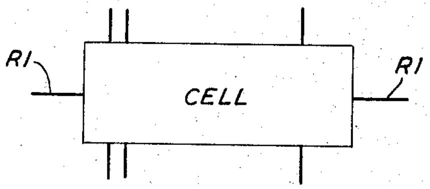
FIG. 4 is a symbol for a cell of the type shown in FIG. 3.
Figure 5:
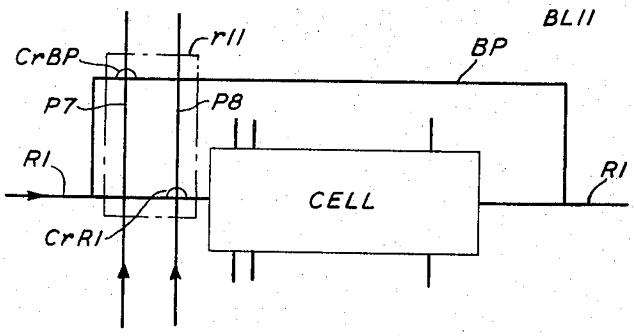
FIG. 5 is a schematic representation of a bit location in accordance with this invention.

A symbol for the cell of FIG. 3 is shown in FIG. 4. In terms of this symbol, the configuration at each bit location is as shown in FIG. 5. The bypass and the row conductor R1, at each bit location, each include a cryotron C$r$BP and C$r$R, respectively. These cryotrons form the routing means $r$11, as shown in FIG. 5. The corresponding controls for these last mentioned cryotrons for each bit location in a column are connected serially in superconducting paths P7 and P8, respectively, between a direct current source 19 and ground. The paths P7 and P8 of each column include cryotrons C$r$P7 and C$r$P8, the controls for which are connected between a Y pulse routing source 20 and ground. Sources 16, 17, 18, and 20 and detection circuit 15 are connected to a control circuit 21 by conductors 22, 23, 24, 25, and 26, respectively.

Initially, direct current source 14 applies a first current to the paths P1 and P2 of all the cells in the memory. As will become clear hereinafter, this current will be, primarily, in one path or the other in each cell in normal operation and the initial distribution of this first current is unimportant. Direct current source 19, similarly, applies a current to paths P7 and P8.

Operation of the illustrative memory of FIG. 1 will now be described primarily in terms of the storage and retrieval of a binary 1 and a binary 0 with respect to a representative bit location BL11. Specifically, Y pulse routing source 20 applies a current to the control of cryotron C$r$P8 in the first column of the matrix and to the control of cryotron C$r$P7 in each of the remaining columns of the matrix under the control of control circuit 21. In this connection, the various sources, detection circuit, and control circuit may be any sources and circuits capable of operating in accordance with this invention. All currents described herein are assumed positive, that is, current is flowing from a source unless specifically designated as negative. A current in the control of cryotron C$r$P8 drives resistive path P8 of the first column routing the current from source 19 through path P7 of that column. A current in path P7 drives resistive the bypass BP at each bit location in the column via cryotrons C$r$BP there as shown in FIGS. 1 and 5. Similarly, the current applied by source 19 to cryotron C$r$P7 of all the remaining columns in the matrix routes current through the paths P8 in each of those columns. This current in paths P8 drives resistive the cryotron C$r$R in each of the remaining bit locations in the matrix, as is shown in FIG. 5, viz. cryotron C$r$R1 as is shown in FIG. 5. A current is applied by Y pulse source 16 coincident with that applied by Y pulse routing source 20 under the control of circuit 21. This current, designated the Y current herein, is applied, illustratively, to all the cells in the first row of the matrix. Since the bypass of bit location BL11 is resistive, the current is routed along the row superconductor into the cell there. On the other hand, cryotrons C$r$R in all the remaining bit locations in the first row of the matrix are resistive, and the Y current is routed along the superconducting bypasses at each of these locations.

Coincident with the pulses supplied by sources 16 and 20, additional pulses are applied by sources 17 and 18. These pulses are also supplied under the control of control circuit 21. For the representative bit location BL11, for the case where source 18 applies a current to cryotron C$r$P5 (see FIG. 1, top left as viewed), the current from source 17 flows through path P6 to cryotron C$r$P4, driving path P4 resistive. The coincident current from source 16, consequently, flows through path P3 to cryotron C$r$P1, driving path P1 resistive. Thus, the current from source 14 is permitted to flow only through path P2 of cell C11 (representing one binary value). For the representative bit location BL11, for the case where source 18 applies a current to cryotron C$r$P6, the current from source 17 flows through path P5 to cryotron CrP3, driving path P3 resistive. The coincident current from source 16, consequently, flows through path P4 to cryotron CrP2 driving path P2 resistive. Thus, the current from source 14 is permitted to flow only through path P1 of cell C11 (representing a second binary value). For the remaining bit locations in the array, it is immaterial whether source 18 applies a current to cryotron CrP6 or CrP5 since in bypassed storage cells there is no current flow from pulse source 16 through either path P3 or P4 to affect the flow of current in paths P1 and P2 therein. It is to be understood in this connection that the currents established in path P1 or P2 persist after the sources thereof are turned off.

We may assume that a current in path P1 represents a stored binary 1 and a current in path P2 represents a stored binary 0. To perform a read operation, a positive pulse is again applied to conductor R1, from Y pulse source 16 under the control of control circuit 21, and routed to cryotron CrP1 of the representative bit location, in the manner described, to drive path P1 resistive. If, at this time, a current is flowing in path P1, that current is rerouted through path P2 thereby generating a voltage transient which is detected by detection circuit 15. On the other hand, if at this time a current is flowing in path P2, that current is unaffected by the pulse applied to conductor R1 and no voltage transient is detected. Alternatively, a current in path P2 may be selected to represent a binary 1, in which case the current applied to conductor R1 is routed to cryotron CrP2 providing analogous results.

The organization and the operation of the memory of FIG. 1 may be summarized in terms of the function of the elements constituting a bit location therein. Specifically, the cell shown in FIG. 3 comprises a pair of paths, each including a cryotron, in one of which paths a current flows depending upon which cryotron is driven resistive. All the cells of a row of the matrix shown are connected serially by a row conductor which divides into first and second branches at each cell in the row. Each branch of the row conductor becomes a control for the cryotron in one of the paths of each path-pair in a row. In addition, a bypass is connected in parallel with the row conductor at each bit location in a row. Each of the bypasses and the row conductors includes a cryotron at each bit location. A pulse applied to a row conductor acts as does a word pulse in a linear select arrangement to access all the bit locations in a row. A pulse applied to the control for the cryotrons in the bypass and word conductor at each bit location determines which of these last mentioned cryotrons is driven resistive and, consequently, whether that word pulse bypasses a bit location in that row or whether the pulse is routed to the cell therein. One bit location of an accessed "word" is selected in this manner. Once selected, however, further logic is employed, illustratively, to determine which of the cryotrons of the originally described paths is driven resistive.

It may be appreciated then that Y pulse source 20 and the direct current source 19 function together as an access switch. Similarly, Y pulse source 16 functions as an access switch. Moreover, each of these switches has $n$ positions (actually the former has $2n$ positions). Further, the path-pairs (paths P1 and P2) of all the bit locations connected serially between direct current source 14 and detection circuit 15 correspond to a sense line, and only one sense line is required per plane. Thus, the illustrative memory is a coincident-current cryotron memory in which the difficulties characteristic of cryotron memories are alleviated. Were a multiplane memory fabricated in accordance with this invention, the sense line for the various planes would be without interconnections therebetween. Although a multiplane memory is not shown herein, the various planes thereof would be identical with the memory plane shown.

It may be appreciated further that the margin limitations in each superconducting path herein are determined by geometric consideration rather than the considerations which determine corresponding limitation in prior art coincident-current arrangements such as the continuous sheet superconducting memory described hereinbefore. Specifically, the current-carrying capacity of a superconducting path, for a given thickness of the superconducting material, is a direct function of the width of the path. This means, for example, that the widths of the gates of cryotrons CrP3 and CrP4 (see FIG. 1, upper left as viewed), determine the maximum current which can be carried by row conductor R1. Since the field generated by a current in cryotron control, such as the controls for cryotrons CrP1 or CrP2, is inversely proportional to the width of the control path, the widths thereof the path P3 or P4, respectively, determine the minimum current necessary to drive cryotrons CrP1 and CrP2 resistive. Accordingly, the margin limitations in accordance with this invention are functions of the widths of the various cryotron gates and controls and are controllable.

It is to be understood that the various superconducting paths need not have uniform widths or like material therealong as is well known. The various paths herein are represented as uniform and are assumed of like material to facilitate the description thereof.

The invention is disclosed herein in terms of cryogenic circuits and, accordingly, in terms of the cryotron which is a basic superconducting element. It is to be understood that the invention may be practiced with other devices which provide the inhibiting function of the cryotron and a path parallel therewith for routing pulses. Also, the circuitry herein need not be superconducting.

Accordingly, it is to be understood that what has been described herein is considered to be illustrative of this invention and that various and numerous other arrangements may be devised by one skilled in the art without departing from the spirit and scope of this invention as defined by the accompanying claims.

What is claimed is:

1. A coincident-current superconducting memory comprising a plurality of storage cells, each of said cells including a superconducting path-pair, first and second paths of each of said path-pairs including first and second cryotrons, respectively, means for selectively establishing a first current in said first path of each of said path-pairs, superconducting bypass means associated with each of said cells, means for applying a second current to the bypasses of a selected set of said cells, and means for routing said second current to a selected cell of said set for selectively driving resistive said first and second cryotrons there.

2. A coincident-current memory in accordance with claim 1 wherein said means for applying said second current comprises a plurality of conductors each associated with a different set of cells, and said superconducting bypass means comprises a plurality of bypasses each connected electrically in parallel with one of said conductors about each cell therealong.

3. A coincident-current memory in accordance with claim 1 wherein said means for routing comprises third and fourth cryotrons in each bypass and in each conductor at each cell therealong, respectively, and control means coupled to said third and fourth cryotrons for selectively driving resistive the bypass and the conductor at each cell.

4. A coincident-current superconducing memory comprising a plurality of superconducting path-pairs arranged generally in rows and columns, first and second parths of said path-pairs including first and second cryotrons, respectively, means for selectively establishing a first current in said first path of each of said path-pairs, means including a plurality of row conductors each connected to said first and second cryotrons of the path-pairs of a corresponding row, a plurality of bypass means each connected electrically in parallel with a row conductor at each path-pair therealong, each of said bypasses including a third cryotron, each of said row conductors also including therein a single fourth cryotron at each path-pair, means for applying a second current to a selected one of said row conductors, and control means for selectively driving resistive said third or said fourth cryotron simultaneously with said second current for selectively routing said second current to said bypasses and said path-pairs along a selected row conductor.

5. A coincident-current superconducting memory in accordance with claim 4, including further control means for selectively routing said second current to said first and second cryotron of each path-pair along a selected row conductor for determining the path of said first current.

6. A coincident-current superconducting memory in accordance with claim 5, also including a conductor connecting all of said plurality of path-pairs electrically in series, and means connected to said conductor for detecting changes in voltage when said second current is routed to a cryotron in said first path if said first path includes said first current.

References Cited

UNITED STATES PATENTS

| | | | |
|---|---|---|---|
| 3,182,293 | 5/1965 | Fruin et al. | 340—173.1 |
| 3,311,898 | 3/1967 | Bremer et al. | 340—173.1 |

BERNARD KONICK, *Examiner.*

J. F. BREIMAYER, *Assistant Examiner.*